United States Patent
Koskinen

(12) 
(10) Patent No.: US 6,176,889 B1
(45) Date of Patent: Jan. 23, 2001

(54) APPARATUS FOR SEPARATING DROPLETS AND/OR SOLID PARTICLES FROM GAS

(75) Inventor: Pekka Koskinen, Kotka (FI)

(73) Assignee: EV Group Oy, Karhula (FI)

( * ) Notice: Under 35 U.S.C. 154(b), the term of this patent shall be extended for 0 days.

(21) Appl. No.: 09/504,046

(22) Filed: Feb. 14, 2000

Related U.S. Application Data

(63) Continuation of application No. 08/930,215, filed as application No. PCT/FI96/00200 on Apr. 12, 1996, now abandoned.

(30) Foreign Application Priority Data

Apr. 13, 1996 (FI) .......................................................... 951821

(51) Int. Cl.[7] .................................................. B01D 45/14
(52) U.S. Cl. ................................. 55/406; 55/407; 95/270
(58) Field of Search ............................. 95/270; 55/400, 55/406, 407, 408, 409, 404, 405, 438, 437

(56) References Cited

U.S. PATENT DOCUMENTS

| | | | | |
|---|---|---|---|---|
| 550,797 | * | 12/1895 | Marshall | 55/438 |
| 1,682,285 | * | 8/1928 | Keith | 55/438 |
| 2,195,707 | * | 4/1940 | Nutting | 55/407 |
| 2,593,294 | * | 4/1952 | Goldberg | 55/406 |
| 2,804,163 | * | 8/1957 | Bullock et al. | 55/408 |
| 3,045,411 | * | 7/1962 | Dalrymple | 55/400 |
| 3,234,716 | * | 2/1966 | Sevin et al. | 55/408 |
| 3,802,162 | * | 4/1974 | Deane | 55/406 |
| 3,877,906 | * | 4/1975 | Peterson | 55/407 |
| 4,006,938 | * | 2/1977 | Reiterer | 55/408 |
| 4,014,673 | | 3/1977 | Kinnison | 55/396 |
| 4,189,310 | * | 2/1980 | Hotta | 55/400 |
| 4,285,707 | * | 8/1981 | Pfenninger | 55/406 |
| 4,877,424 | * | 10/1989 | Perkola et al. | 55/406 |
| 4,903,462 | * | 2/1990 | Nagashima et al. | 55/400 |

FOREIGN PATENT DOCUMENTS

| | | | |
|---|---|---|---|
| 115085 | * | 5/1942 | (AU) ..................................... 55/400 |
| 34 38 400 A1 | | 4/1986 | (DE) . |
| 0 191 228 A2 | | 8/1986 | (EP) . |
| 28724 | | 4/1957 | (FI) . |
| 30511 | | 12/1959 | (FI) . |
| 89562 | | 10/1991 | (FI) . |
| 180711 | | 9/1962 | (SE) . |
| 328 847 | | 9/1970 | (SE) . |
| WO 91/15283 | | 10/1991 | (WO) . |

* cited by examiner

*Primary Examiner*—Duane S. Smith
(74) *Attorney, Agent, or Firm*—Kubovcik & Kubovcik

(57) ABSTRACT

An apparatus for separating droplets and/or solid particles from a gas. The apparatus includes a shell defining a space. An impeller in the space and a gas inlet duct through the shell are arranged for introducing gas with liquid and/or solid particles into the space. A driving device rotates the impeller. One or several openings are arranged around the shell. At least a major portion of the liquid and/or solid particles exit through the openings and may be carried into a collecting space which may be outside the shell.

7 Claims, 1 Drawing Sheet

APPARATUS FOR SEPARATING DROPLETS AND/OR SOLID PARTICLES FROM GAS

This application is a continuation of application Ser. No. 08/930,215, filed Jan. 5, 1998 now abandoned. Application Ser. No. 08/930,215 is the national stage in the United States of PCT/FI96/00200 filed Apr. 12, 1996.

BACKGROUND OF THE INVENTION

1. Field of the Invention

The present invention is related to devices for separating gaseous solutions or mixtures and, more particularly, to an apparatus for separating droplets and/or solid particles from a gas.

2. Description of the Related Art

Water, fibers or other such particles have commonly been separated from gas, particularly in connection with exhaust air of a paper machine wire section ventilation system, by using cyclone-type separators. A drawback of such separators is their great dimensional size when air flow is for example 10–30 m³/s. Additionally, great pressure losses of cyclones and also their weak ability to separate the lightest particles or water mist has been experienced as a problem.

Another known way has been to provide an exhaust duct with so called vortex-separators, of which an example is shown in U.S. Pat. No. 4,014,673. In the solution according to that, fixed vanes impart rotating movement to the flowing air, whereupon particles flowing along the air are thrown into side walls of the device. Pressure loss required for accomplishing adequate centrifugal forces is a disadvantage in operation of this device also. In such devices, where only simple vanes are used, small particles moving near the center of the device do not have time to reach the side walls of the device before leaving it, whereupon the degree of separation remains unsatifactory.

In the solution shown in Finnish patent document 28784, the requirement for gas and collected water to move into different directions in an exhaust duct causes problems. In order to operate reliably, this solution calls for an extremely large diameter of the shell for reducing air velocity to a level, in which formed droplets do not follow the air flow anymore. Additionally, the device must be in a certain position in order to function at all.

In the solution shown in Finnish patent document 89562, the exhaust air is forced to make a change in flow direction, which in case high velocities are in question means always exess pressure losses and consumption of power. Additionally the construction requires a great deal of space.

In DE 3438400 there is shown circularly placed, specially formed plates for separating droplets. The plates are intended to change the direction of air flow and thus cause suitable impact and collect surface for the droplets. In this kind of solution problems may arise if the air contains also other impurities than liquid and if air velocity changes.

It is an intention of the present invention to provide an apparatus which minimizes the problems of prior art.

SUMMARY OF THE INVENTION

The apparatus according to the present invention has several considerable advantages. The apparatus of the present invention may always be installed in a desired position according to installation place. The solution according to the invention may be connected to an already existing centrifugal blower. In the solution according to the present invention the exhaust air (or gas) does not have to make substantial changes in direction, which makes it possible to avoid generation of exess pressure losses and thus also unnecessary power consumption. Additionally, the space requirement of the apparatus according to the invention is very small. In the solution according to the invention a droplet or any impurity carried by gas flow is always subjected to adequate velocity, regardless of gas flowrate, for reaching a surface for adhesion. The surface being smooth, it remains better clean and keeping it clean is simple by injecting for example cleaning water into the gas flow.

The present invention is directed to an apparatus for separating droplets and/or solid particles from gas, which apparatus comprises a shell defining a space into which an impeller and a gas inlet duct for introducing gas and liquid and/or solid particles into the space are arranged, and a driving device for rotating the impeller.

BRIEF DESCRIPTION OF THE DRAWINGS

In following the invention is exemplary explained by reference with following drawings, in which.

DETAILED DESCRIPTION OF THE INVENTION

Figure 1:
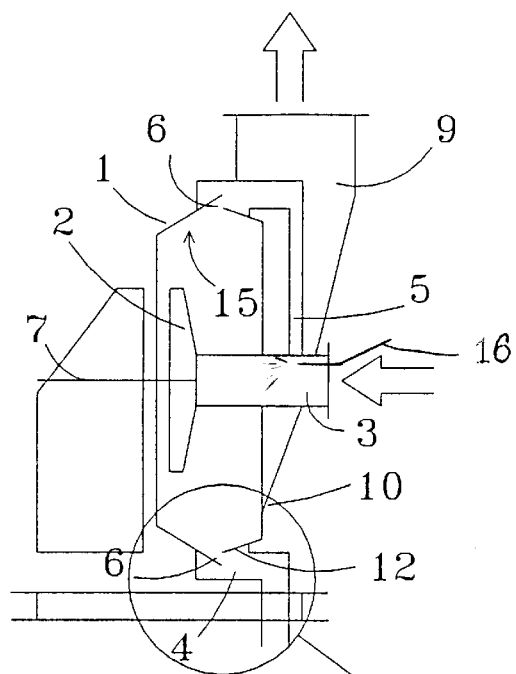
FIG. 1 shows a partial side view of an apparatus according to the invention.

In FIG. 1 there is shown an apparatus for separating droplets and/or other solid particles from gas. The apparatus comprises an impeller 2, to which water and/or impurities containing gas, preferably air is led through a centrally positioned inlet duct 3. The impeller is in a space, which is defined preferebly but not necessarily by a substantially rotationally symmetrical shell 1.

While rotating by means of a driving device 7, such as a motor and suitable power transmission equipment, the impeller 2 imparts rotational movement to the gas, water and/or solid particles in the space defined by the shell, whereupon the particles and/droplets heavier than the gas are thrown to inner wall of the shell 1 by effect of centrifugal forces, onto which inner wall of the shell 1 a water film is generated. Gas leaves the space defined by the shell 1 through outlet unit 9. The outlet unit 9 is arranged into the shell to the wall section 10 opposite to the impeller 2.

The gas impact area 15 on the shell 1 is preferably formed so that droplets would not disengage from any point of discontinuity back to the gas flow. The generated liquid film and the gas flow following it are separated from each other by means of one or several openings 6 arranged into the shell 1. One or several openings 6 is arranged in case of FIG. 1 in the shell 1 preferably to the area between the impeller 2 and a wall section 10 opposite to the impeller. Liquid, as well as possible solid particles, may exit through opening 6 into a collecting space 4, from which collecting space collected liquid, as well as possible solid particles, is led by means of an outlet duct 8, for example, into a separate colletor tank or a discharge conduit. The opening comprises preferably one or several openings 6 arranged into the perimeter of the shell 1.

The collecting space 4 may be connected for example by a duct 5 to suction side of the apparatus or to separate vacuum source, if so desired. By this arrangement it is possible to secure and/or adjust suitable pressure level between the space defined by the shell 1 and the collecting space 4.

Opening 6 is typically preferably an annular slot 6. Side wall of the shell 1 is formed beginning from impeller 2 side wall end, as a wall section 11 firstly expanding towards the outlet unit 9 side wall section to be in a form of truncated cone ending to the annular slot 6. And secondly, after that the wall section 12 extends towards the outlet 9 side wall section as reducing truncated cone shaped wall section 12. A slot 6 is arranged between the adjacent edges of the wall sections 11 and 12, whereupon the outlet side wall section 12 is extending at its impeller side edge more inwards, in a direction of a radius of an axis parallel to the rotation axis of the impeller 2, than the outlet 9 side edge of the impeller side wall section 11 in the space defined by the shell 1.

The collecting space 4 is arranged outside the shell surrounding the shell at least at the location of the slot 6. A conduit 5 is provided to connect the collecting space 4 to the suction side of the apparatus, for example to the inlet duct 3. In the embodiment according to FIG. 1 the conduit 5 is connected into upper section of an annular collecting space 4. The outlet 8 for separated liquid and/or solid particles is preferably arranged into lowermost section of the collecting space 4, or vicinity of the lowermost section. In connection with the outlet 8 for separated liquid and/or solid particles is arranged a drain trap or a like if so desired.

The apparatus according to the invention may also include a cleaning device, by which cleaning agent (eg. water and/or solvent) is injected into gas/liquid/solid particles to be led into the apparatus, so that fibers or other impurities (condensible gaseous or solid ones) would not deposit on the impeller 2 and/or shell 1 surfaces. The cleaning agent may also be injected directly into the apparatus. Additionally, the cleaning device may be used for maintaining the shell adequately wet.

Figure 3:
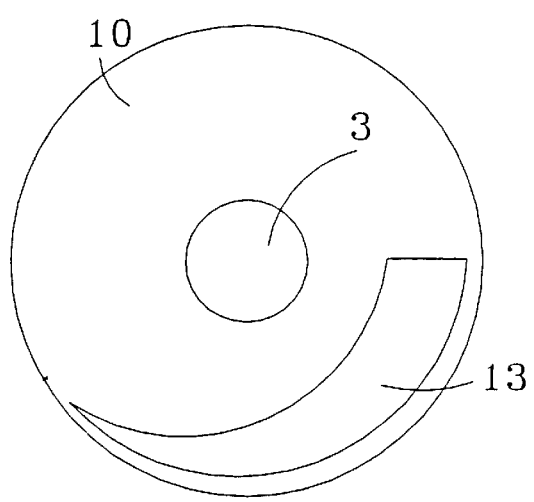
FIG. 3 shows another detail of an apparatus according to the invention.

The discharge outlet 13 for gas is preferably formed to enlarge towards the outlet unit 9. In FIG. 3 there is shown a presently preferred form of the discharge outlet 13. The figure shows the end wall 10 seen from outside the shell in the gas flow direction. The discharge outlet 13 having an opening with increasing area in the rotation direction of the impeller 2, is formed into the wall 10. The outlet unit is arranged to enclose the discharge outlet 13.

Figure 2:
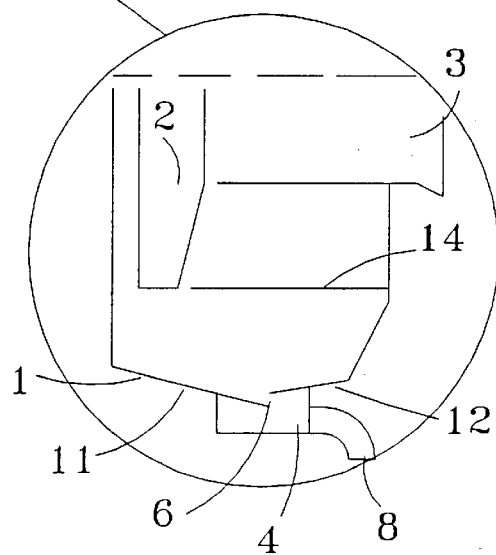
FIG. 2 shows a detail of an apparatus according to the invention.

In FIG. 2 there is shown preferably a tubular or cylindrical shroud 14 extending in proximity of the impeller 2, which shroud 14 is arranged around the gas inlet duct 3. By means of the shroud 14 the performance of the apparatus may be further improved.

It is apparent to a man skilled in the art that the present invention is not to be limited into the shown embodiments, but it may vary within the scope of the appending claims.

What is claimed is:

1. An apparatus for separating particles from gas, which apparatus comprises a shell (1) defining a space;

an impeller (2) mounted on a horizontally extending axis in said space;

a gas inlet duct (3) opposite said impeller and arranged for introducing gas containing said particles into the space;

a driving device (7) for rotating the impeller (2);

said shell (1) including a first side wall adjacent said impeller and a second side wall (10) opposite said impeller and having said gag inlet duct (3) arranged therein, a first truncated cone wall section (11) extending from said first side wall and expanding in a direction of said second side wall and ending at a perimeter of said shell (1), and a second truncated cone wall section (12) extending from said perimeter and reducing in a direction of said second side wall; and one or more openings (6) formed in said perimeter, through which openings (6) at least a major portion of the particles separated from the gas may be carried into an annular collecting space (4) outside the shell (1).

2. An apparatus according to claim 1, wherein collecting space (4) is operatively connected to a suction side of the apparatus or to a separate vacuum source.

3. An apparatus according to claim 1, wherein a discharge outlet (13) is formed in said second side wall (10) and has an opening with increasing area in the rotation direction of the impeller (2).

4. An apparatus according to claim 1, wherein said one or more openings (6) is an annular slot, through which the particles may enter the annular collecting space (4).

5. An apparatus according to claim 1, wherein a tubular or cylindrical shroud (14) extending in proximity of the impeller (2), is arranged around the gas inlet duct (3).

6. An apparatus according to claim 1, wherein a cleaning device, is arranged into the apparatus, for injecting cleaning agent into the gas to be led into the apparatus.

7. An apparatus according to claim 1, wherein an outlet (8) for separated particles is arranged in a lowermost section of the collecting space (4).

* * * * *